(12) United States Patent
Langemaat

(10) Patent No.: US 11,318,070 B2
(45) Date of Patent: May 3, 2022

(54) DEVICE FOR DE-STACKING AND SPREADING OUT MEDICATION PACKAGED IN POUCHES

(71) Applicants: LO&T Beheer B.V., Emmen (NL); ZIUZ Holding BV, Gorredijk (NL)

(72) Inventor: Willem Langemaat, Emmen (NL)

( * ) Notice: Subject to any disclaimer, the term of this patent is extended or adjusted under 35 U.S.C. 154(b) by 233 days.

(21) Appl. No.: 15/733,082

(22) PCT Filed: Nov. 22, 2018

(86) PCT No.: PCT/NL2018/050785
§ 371 (c)(1),
(2) Date: May 14, 2020

(87) PCT Pub. No.: WO2019/108057
PCT Pub. Date: Jun. 6, 2019

(65) Prior Publication Data
US 2020/0281817 A1    Sep. 10, 2020

(30) Foreign Application Priority Data
Nov. 30, 2017 (NL) .................................... 1042664

(51) Int. Cl.
*A61J 7/00* (2006.01)
*B65G 13/06* (2006.01)
(Continued)

(52) U.S. Cl.
CPC ............ *A61J 7/0076* (2013.01); *B65G 13/06* (2013.01); *B65G 39/04* (2013.01); *B65G 47/1457* (2013.01); *B65G 2201/027* (2013.01)

(58) Field of Classification Search
CPC ........................................................ A61J 7/0076
(Continued)

(56) References Cited

U.S. PATENT DOCUMENTS 3,782,527 A    1/1974  Petershack
3,939,961 A    2/1976  Anikanov
(Continued)

FOREIGN PATENT DOCUMENTS

| EP | 1338518 A1 | 8/2003 |
| EP | 2175230 A1 | 4/2010 |

OTHER PUBLICATIONS

International Search Report in PCT application No. PCT/NL2018/050785, dated Apr. 17, 2019.
(Continued)

*Primary Examiner* — Gene O Crawford
*Assistant Examiner* — Ayodeji T Ojofeitimi
(74) *Attorney, Agent, or Firm* — Oppedahl Patent Law Firm LLC

(57) ABSTRACT

The present invention relates to a device for de-stacking and spreading out medication packaged in pouches (2), which pouches are arranged successively in a ribbon-like medication roll (101), comprising a transport track (102) configured to transport the unrolled pouches of the medication roll, wherein the transport track comprises a section over which the pouches are displaceable and wherein the underside of at least one pouch lies against an upper side of the section during operation, and the section comprises means for de-stacking and spreading out the medication in a pouch lying on the section during operation, wherein the device is configured to co-act with means for supplying or discharging the medication roll over the transport track.

14 Claims, 4 Drawing Sheets

(51) Int. Cl.
*B65G 39/04* (2006.01)
*B65G 47/14* (2006.01)

(58) Field of Classification Search
USPC .................................................. 221/70–73
See application file for complete search history.

(56) References Cited

U.S. PATENT DOCUMENTS

| | | | | | |
|---|---|---|---|---|---|
| 5,860,561 | A * | 1/1999 | Saldana | ............... | A61F 15/001 221/72 |
| 6,595,349 | B2 * | 7/2003 | MacSwan | ............... | B65G 47/54 198/370.09 |
| 6,962,266 | B2 * | 11/2005 | Morgan | ............... | A47L 15/4472 221/72 |
| 7,683,235 | B2 * | 3/2010 | Wendorf | ............... | A61F 15/001 602/41 |
| 2005/0115979 | A1 * | 6/2005 | Hellstrom | ............... | B65H 35/04 221/25 |
| 2005/0224511 | A1 * | 10/2005 | Kim | ............... | G07F 11/42 221/84 |
| 2010/0163571 | A1 * | 7/2010 | Mizoro | ............... | B65H 29/006 221/71 |
| 2011/0168734 | A1 * | 7/2011 | Razzaboni | ............... | G07D 11/12 221/71 |
| 2013/0126548 | A1 * | 5/2013 | Pourian | ............... | B65D 83/04 221/303 |
| 2013/0134179 | A1 * | 5/2013 | Cooke | ............... | B65H 29/006 221/1 |

OTHER PUBLICATIONS

Written Opinion in PCT application No. PCT/NL2018/050785, dated Apr. 17, 2019.

* cited by examiner

DEVICE FOR DE-STACKING AND SPREADING OUT MEDICATION PACKAGED IN POUCHES

The present invention relates to a device for de-stacking and spreading out medication packaged in pouches or sachets, which pouches are arranged successively in a ribbon-like medication roll, comprising a transport track configured to transport the unrolled pouches of the medication roll, wherein the transport track comprises a section over which the pouches are displaceable and wherein the underside of at least one pouch lies against an upper side of the section during operation, and the section comprises means for de-stacking and spreading out the medication in a pouch lying on the section during operation, wherein the device is configured to co-act with means for supplying or discharging the medication roll over the transport track.

Various machines are available on the market which automatically check the contents of the pouches, which comprise for instance pills, tablets and/or capsules, in respect of the specific type and numbers of these pills, tablets and/or capsules using vision systems. These machines will also be referred to hereinafter as inspection machines.

The use of the medication roll system, wherein medication is packaged in a pouch per patient, per day and per ingestion moment and wherein a plurality of bags are mutually connected as a ribbon, has been known in the prior art for a long time.

It is possible in cases in which two tablets for instance lie on top of each other in a pouch for the automatic vision system to detect only one tablet when counting the numbers and to therefore give an error message, which will turn out to be a so-called false error message when checked by a person. Two tablets, pills and/or capsules lying partially on each other may also be regarded by an inspection machine as being an object with an unrecognizable shape, which also results in a false error message. It will be apparent that such false error messages needlessly require more time and more human intervention. As a result, false error messages also increase the cost of the overall process of packaging medication in medication rolls, also referred to in practice as Baxter rolls after the first company to apply this method of packaging medication, for patients. It is also possible that the contents of a pouch are evaluated as being good in respect of number and type of medication by the inspection machine, but that one tablet too many of a determined medication is for instance present in the pouch due to stacking of medication, wherein this tablet is overlooked by the inspection machine as a result of the stacking. This is a false no error message. This can result in overdosing, which entails a risk for patients.

Besides being caused by stacked medication, inspection of the contents of medicine pouches with an inspection machine can also result in false error messages when the individual pills, tablets and/or capsules are insufficiently dispersed over the surface of a pouch. In such a case the inspection machine can for instance regard two pills, tablets and/or capsules lying tightly against each other as an object with an unknown shape.

In the usual commercially available inspection machines a spool with a medication roll wound thereon is placed rotatably about a shaft or shaft-like member, and the free outer end of the medication roll is fed into the machine and transported by means of a transport system of for instance cylinders or rollers through the inspection machine which is provided with a camera unit.

Diverse pouch transport systems of known inspection machines have the drawback that tensile forces are exerted on a pouch in some way or other during advancing of a pouch, whereby the underside and the upper side of the pouch have a tendency to move toward each other and tablets, pills and/or capsules which may be stacked on each other are thereby pressed together with an additional force.

Since the force required for unrolling of the medication roll has to be produced in some inspection machines by exerting a tensile force on the pouches, the force with which medication is pressed together can be relatively high.

De-stacking of the medication in such a case without this having an adverse effect on the inspection process in an inspection machine or without running the risk of damaging the medication has been found not to be easy. For the purpose of de-stacking, or at least attempts thereto, a supporting surface over which the pouches are guided and which is mounted on a vibrating system is applied in diverse prior art systems, also in systems wherein unwinding of the ribbon formed by the pouches takes place by means of driving the spool with a motor.

It has been found in practice that when such a vibrating supporting surface is applied, the amplitude of the vibration of the surface has to be relatively high in order to de-stack a significant percentage of the stacked medication. This has the result that the risk of damage to medication increases.

The known devices all comprise a plate-like section in the transport track, which plate-like section is placed on a vibrating mechanism, whereby this plate-like section can be set into vibration as a whole. In this manner, apparent to a skilled person, of de-stacking of pills, tablets and/or capsules situated in a pouch a relatively large number of stacked pills, tablets and/or capsules is not de-stacked, even when very high vibratory amplitudes and frequencies are applied.

Damage also occurs relatively frequently. Diverse tests and observations performed by applicant of the present patent application using video images played in slow motion have provided him with the insight that bringing a pouch into contact with a vibrating plate will generally lead to de-stacking and spreading to only limited extent.

The device according to the invention provides a reliable solution with a high degree of spreading and de-stacking of medication and a low risk of damage, without the above stated drawbacks of the known devices. The device according to the invention provides a solution which can at least substantially preclude the chance of false error messages and false no error messages by inspection machines as a result of stacking or insufficient spreading of medication.

For this purpose the invention provides a device according to the preamble, characterized in that the means for de-stacking and spreading out of the medication comprise an eccentric track, this eccentric track comprising a plurality of eccentric shafts placed adjacently of each other, which shafts are each arranged substantially at a right angle to the longitudinal direction of the transport track, and each eccentric shaft comprises one or more eccentrics. The distance between successive eccentric shafts is here chosen such that the peripheral edges of the eccentrics, as seen in transverse direction of the section, overlap each other and at least one eccentric shaft is drivable by means of a drive motor.

These technical measures have the technical effect that each pouch is tapped in differentiated manner at every position of the pouch, both in the length and in the width of the pouch.

In an embodiment of the device according to the invention one or more eccentrics are slidable over the length of an eccentric shaft, rotatable about an eccentric shaft and fixable on an eccentric shaft.

In a further embodiment of the device according to the invention the device comprises at least one fan situated above or below the eccentric track for the purpose of keeping the pouches in contact with the eccentric track.

In an elegant embodiment of the device according to the invention the device comprises at least one fan situated above and/or below the eccentric track, wherein both the suction side of each of the fans situated above the eccentric track and the suction side of each of the fans situated below the eccentric track are directed toward the eccentric track. Owing to these measures the device is able to pull the lower and upper film layer of a pouch apart, whereby space is created in the pouches. Stacked pills can hereby be de-stacked better. A very thin flexible film is sometimes used to produce the medicine pouches. It is also possible here that there is little air in the pouches. Because the film is very thin and flexible, the two film layers are deformed and the medication becomes as it were fixed between the two deformed film layers. By now also mounting fans, which have a suction action relative to the ribbon of pouches, above the ribbon of medicine pouches, the two film layers are as it were pulled apart, and space is created in the medicine pouches, whereby the medication is given freedom to move. All the fans are individually adjustable, whereby they can be adjusted such that contact between the eccentrics and the medicine pouches, and thus indirectly with the medication, is maintained.

In order to ensure that the supply means always unroll the medication roll sufficiently to prevent tensile stress on the pouches, but at the same time do not unroll it to such an extent that a stack of pouches is created under the spool, the device according to the invention preferably comprises a sensor, wherein the device is configured such that during operation the supply means are switched off as soon as the sensor detects that a pouch is situated in the immediate vicinity of the sensor.

In an alternative embodiment of the device according to the invention the drive motor drives one of the eccentric shafts, wherein the other shafts are also drivable by means of drive wheels which press against each other and which are for instance manufactured from rubber or another elastically deformable material. In this form of drive mutually adjacent eccentric shafts have opposite rotation directions.

In yet another embodiment of the device according to the invention the device comprises at least one eccentric shaft with an eccentric mounted on the eccentric shaft at an angle. This achieves that when the eccentric comes into contact with a pouch, it not only lifts the pouch but at the same time also performs a lateral movement, i.e. a movement in the width direction of the pouch. This latter stated effect can be particularly useful in the de-stacking and dispersing of some forms of medication.

The device according to the invention will now be discussed with reference to several figures. Herein:

In the figures the same or similar parts have the same or similar reference numerals.

Figure 1:
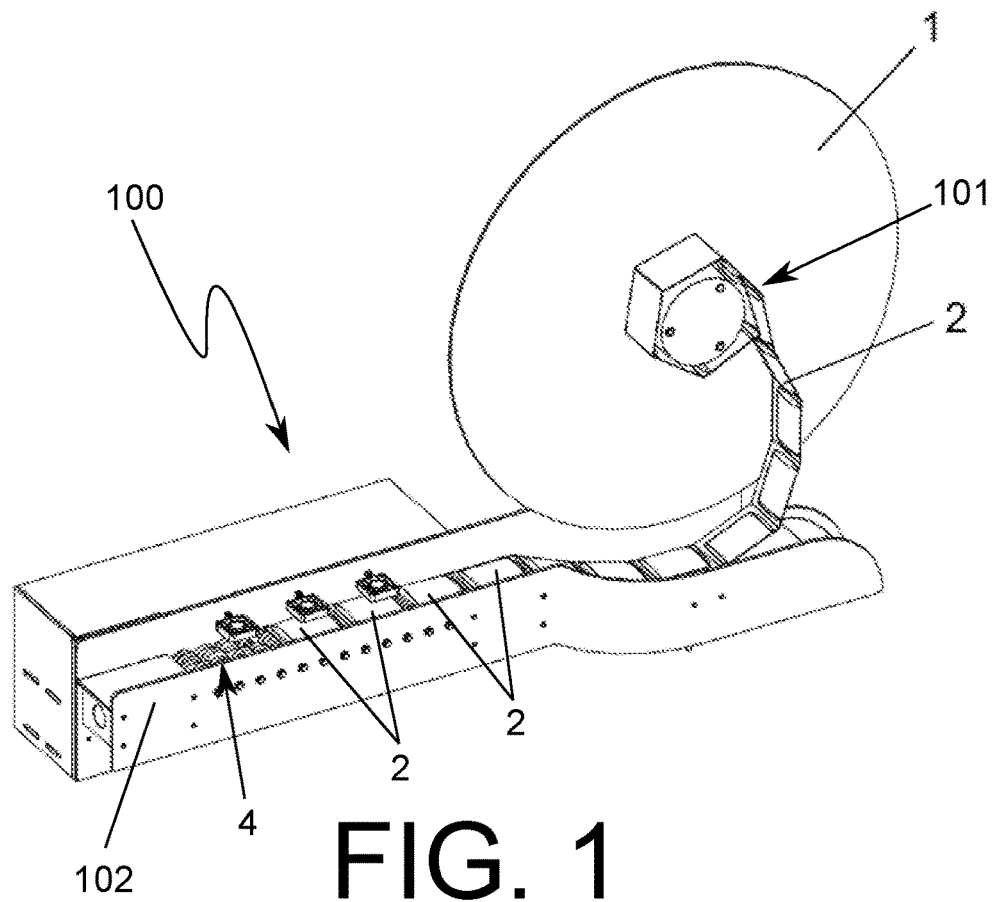
FIG. 1 is a schematic perspective front view of an exemplary embodiment of the device according to the invention.

FIG. 1 shows a perspective front view of an exemplary embodiment of the device according to the invention. In this exemplary embodiment the device comprises a spool 1 with a ribbon formed by pouches 2 wound around the core of the spool. The rolled-up ribbon of pouches, also referred to hereinafter as medication roll, has already been unrolled almost entirely in the situation shown in FIG. 1, whereby the spool is almost empty.

In the situation shown in FIG. 1 a part of the ribbon formed by pouches lies on a transport track, defined here as an elongate member over which the ribbon with the pouches which lie flat, also referred to as lying on a side surface, can be pulled, slid or otherwise advanced in the direction of for instance an inspection machine or other type of machine which, on the basis of the arrangement shown in FIG. 1, will normally be situated to the left of the device.

Figure 2:
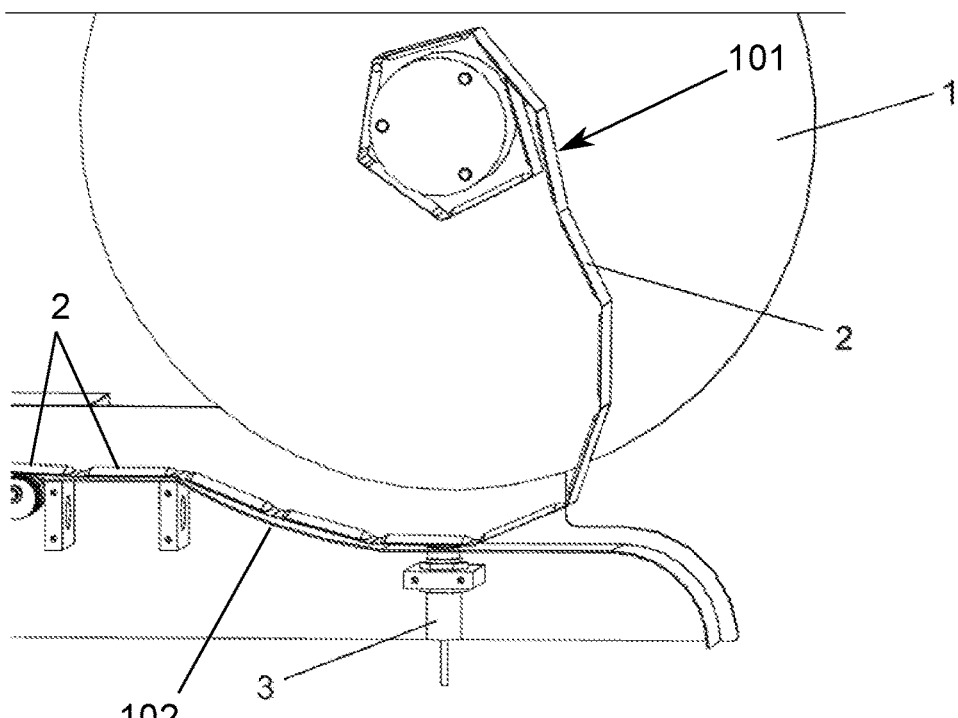
FIG. 2 is a cut-away schematic front view of a part of the exemplary embodiment of the device according to the invention shown in FIG. 1.

FIG. 2 shows a cut-away schematic front view of a part of the exemplary embodiment of the device according to the invention shown in FIG. 1. The means for supplying or discharging the medication roll (101) over the transport track (102) preferably comprise a spool 1 for the purpose of unrolling the medication roll by means of a driven drive means, for instance by means of an electric motor.

The device according to the invention therefore prevents the medication roll from having to be unrolled by pulling on the ribbon formed by the pouches. In order to ensure that the drive always unrolls the medication roll sufficiently to prevent tensile stress on the pouches, but at the same time does not unroll it to such an extent that a stack of pouches is created under the spool, the device comprises at the start, as seen from the position of spool 1, of the transport track for the pouches a sensor 3, for instance in the form of a capacitive proximity switch or a photocell, which switches off the drive as soon as the sensor detects that a pouch is situated in the immediate vicinity of the sensor.

The invention has the provision that the control of the drive which rotates the spool is configured such that the sensitivity and thereby the moment of switching on and off of the drive of the spool can be adjusted subject to a desired position of the pouches. Ensuring that the ribbon is for instance substantially in a position similar to the position shown in FIG. 2 prevents the creation of tensile stresses on the pouches.

At the other outer end the ribbon of pouches is transported further through the transport system of a machine situated downstream of the device, such as for instance an inspection machine.

Figure 3:
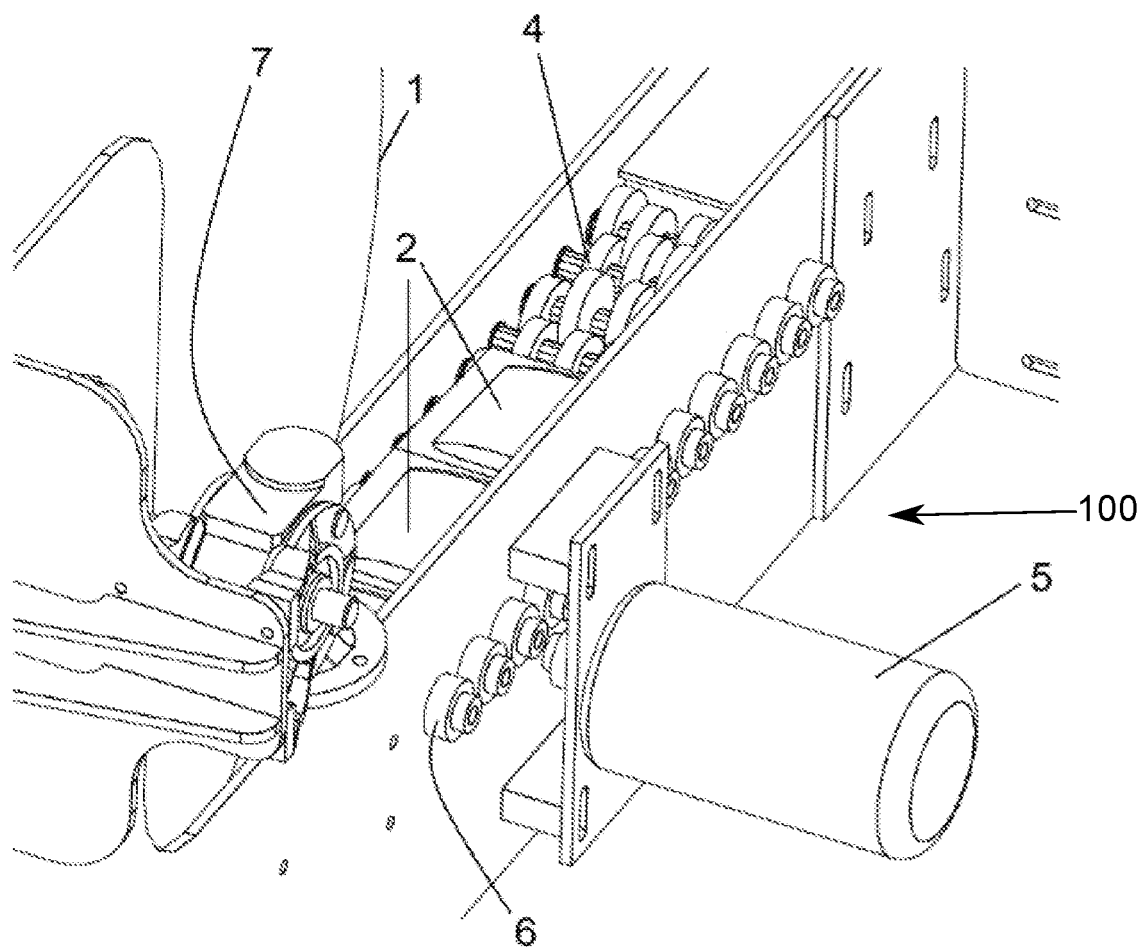
FIG. 3 is a schematic perspective rear view of a part of the exemplary embodiment of the device according to the invention shown in FIG. 1.

FIG. 3 is a schematic perspective rear view of a part of the exemplary embodiment of the device according to the invention shown in FIG. 1. In FIG. 3 the two front pouches 2 of a medication roll are visible while lying on an eccentric track 4, which forms a section in the transport track of the device. FIG. 3 further shows the drive motor 5 of the shafts of eccentric track 4, which will be discussed further hereinbelow. In this exemplary embodiment the drive motor drives one of the shafts of eccentric track 4, wherein the other shafts are also driven by means of drive wheels 6 which press against each other and which are for instance manufactured from rubber or another elastically deformable material. In this form of drive mutually adjacent eccentric shafts have opposite rotation directions.

The invention has the provision that the shafts of eccentric track 4 can also be driven in any other feasible manner, such as for instance by means of a drive belt or a chain, wherein all eccentric shafts can also have the same rotation direction.

FIG. 3 also shows the rear side of spool 1 and the spool drive 7 of this exemplary embodiment of the device according to the invention.

Figure 4:
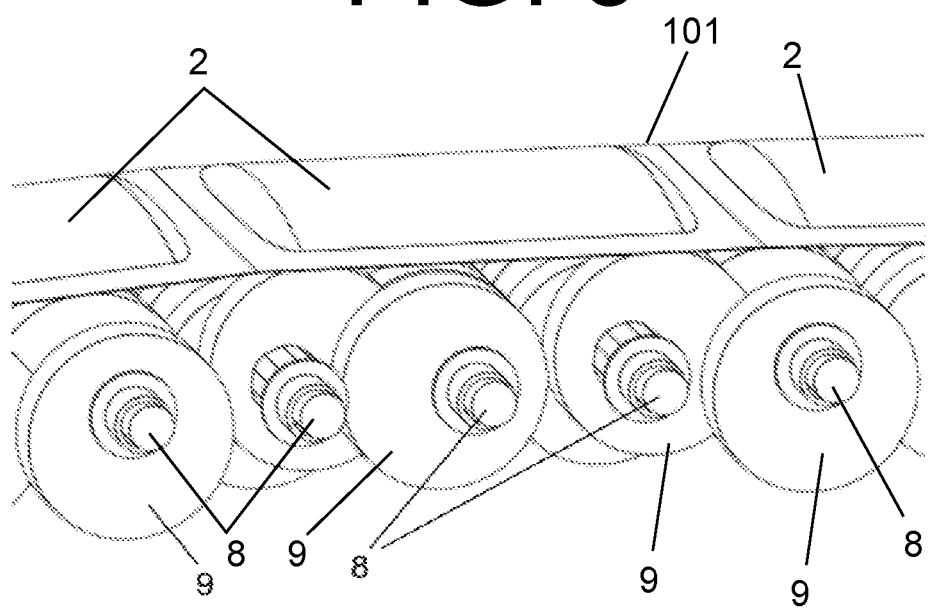
FIG. 4 is a schematic perspective detail of the eccentric track of the device with pouches lying thereon.

FIG. 4 is a cut-away schematic perspective detail of a part of the eccentric track 4 of the device with pouches from a ribbon comprising pouches lying thereon. For the sake of simplicity medication situated in the pouches is not shown.

The solution for obviating the drawbacks of the known devices was eventually found to lie in tapping the pouch in differentiated manner at positions both in the length and in the width of a pouch. In order to achieve this, the device according to the invention comprises the eccentric track 4, this comprising a plurality of eccentric shafts 8 configured for rotation, wherein each shaft comprises one or more eccentrics 9 which are non-rotatable relative to the shaft and are distributed over the length of the shaft, which length substantially coincides with the width of the pouches advancing over the eccentric track. In an exemplary embodiment one or more of the eccentric shafts 8 are manufactured from hexagonal rod material.

In the exemplary embodiment shown in FIG. 4 the eccentric shafts 8 comprise partially machined hexagonal material, which gives the shafts visible in the figure the appearance of twelve-sided rod material. Of the twelve sides, only six are however flat, and the other six, created by the machining, are convex.

In the embodiment shown in FIG. 4 the eccentrics 9 comprise a circular disc with an eccentrically arranged circular hole adapted to the diameter of the eccentric shafts.

In order to prevent rotation and unintended axial displacement of the eccentrics, the eccentrics can be provided with for instance a countersunk locking screw which can for instance engage the eccentric shaft on one of the six flat sides. In the part of an exemplary embodiment of an eccentric track shown in FIG. 4 the eccentric shafts are positioned so close together that the circles described during rotation of the shafts by the extreme points of the eccentrics which are mounted on two mutually adjacent eccentric shafts overlap each other.

In this configuration the eccentrics on two mutually adjacent eccentric shafts will therefore have to be mounted offset relative to each other in the longitudinal direction of the eccentric shafts so as to enable rotation of the eccentric shafts.

Other embodiments of the eccentric track comprise eccentric shafts with sufficient mutual distance between the eccentric shafts to allow rotation of the shafts without the necessity of arranging the eccentrics offset relative to each other in axial direction on two mutually adjacent eccentric shafts.

When a shaft is rotated it will be possible in the width direction of a pouch for different positions on this line of the pouch to be tapped by an eccentric at different moments. The distance over which the point in question of the pouch moves upward when touched by an eccentric can here for instance be influenced by the size of the eccentric 9, also referred to as cam 9, or the position in which the eccentric is mounted on the shaft.

In addition to the differentiation in the width direction, the device according to the invention also comprises differentiation in the length direction of a pouch. The middle pouch, shown in its full length in FIG. 4, is in the shown position for instance supported in its length direction by three eccentric shafts. The number of points where the surface of a pouch is tapped during rotation of the eccentric shafts thus for instance amounts to twelve if each eccentric shaft 8 comprises four eccentrics.

Although a larger number of eccentric shafts will usually be opted for in practice, the invention also provides embodiments of the device in which eccentric track 4 comprises only one eccentric shaft 8. The number of eccentrics per shaft can be adjusted as desired by users and can vary from only one eccentric on a shaft to, depending on the thickness of the eccentrics to be mounted, for instance ten or more.

The eccentrics shown in FIG. 4 comprise a circular disc with an eccentric hole, with which the disc is slid over shaft so as to mount the eccentric on the shaft.

The invention of course has the provision that the eccentrics can also have the shape of for instance a rectangle, including a square, a triangle, a hexagon, an oval, and any other shape which is desired or deemed useful, as long as there are cams which alternately do and do not tap/lift the pouches with a determined frequency when the eccentric shafts rotate.

In the embodiments shown in the figures the plane formed by the eccentrics lies substantially at a right angle to the longitudinal axis of the eccentric shafts. The invention however also comprises embodiments wherein the plane of the eccentrics forms an angle of for instance fifty, sixty, seventy or eighty degrees, or any angle lying therebetween, with the longitudinal axis of the eccentric shaft on which the eccentric is mounted. This achieves that, when the eccentric comes into contact with a pouch, it not only lifts the pouch, but simultaneously also performs a lateral movement, i.e. a movement in the width direction of the pouch. This latter stated effect can be particularly useful in the de-stacking and dispersing of some forms of medication. An eccentric being mounted on an eccentric shaft in this manner, i.e. not at a right angle, will also be referred to hereinbelow as an eccentric being mounted on an eccentric shaft at an angle.

An eccentric track 4 configured according to the exemplary embodiment shown in FIG. 4 and discussed here has been found particularly effective for de-stacking and spreading out of medication packaged in pouches. When a ribbon of pouches is carried over eccentric track 4 without further measures, the pouches can have a tendency to start 'floating' at least substantially above the eccentric track. In the case of floating the pouches do not come into contact with eccentrics 9 to sufficient extent, and the de-stacking therefore does not progress optimally.

Prior art machines often comprise foam rubber rollers or brushes in order to keep the pouches pressed against their vibrating plate in the conveyor track. In such known machines this regularly results in a higher chance of damage to the medication.

Figure 5:
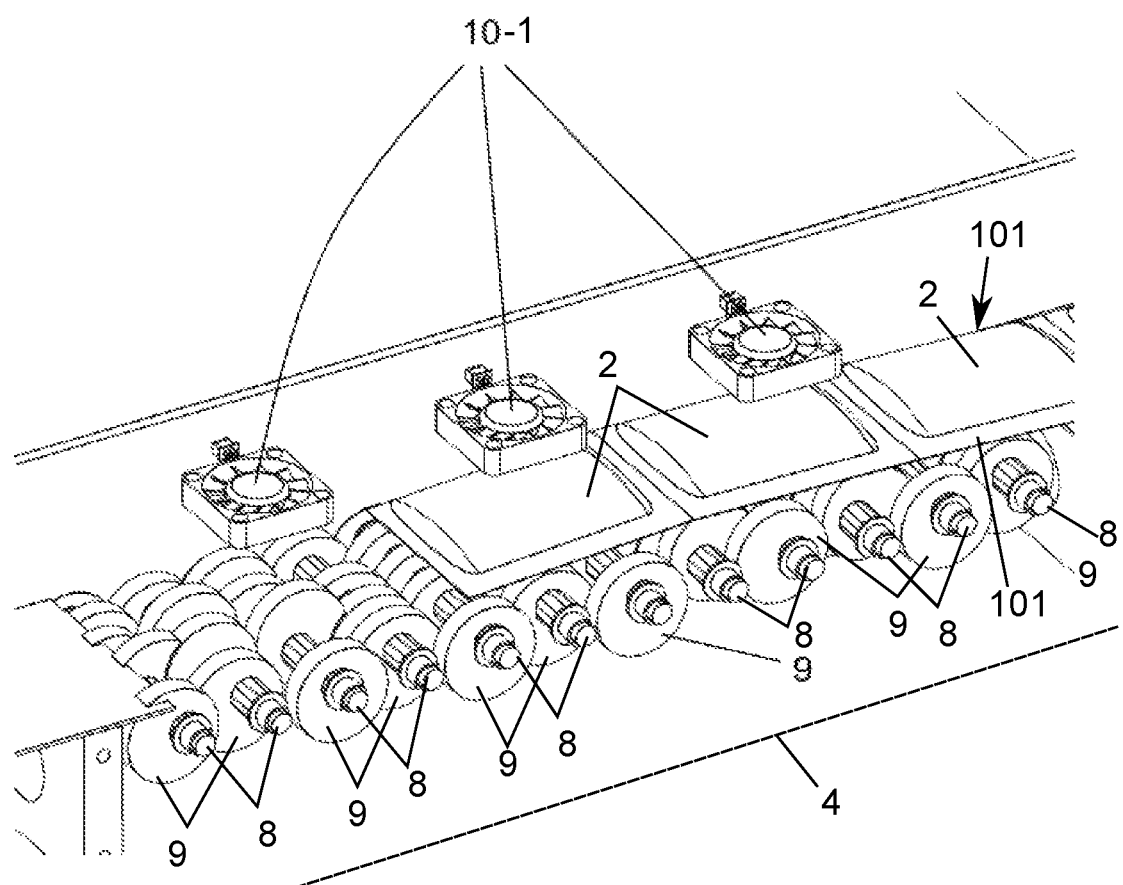
FIG. 5 is a cut-away schematic view of the eccentric track with pouches lying thereon and fans positioned above the eccentric track.

As shown in the cut-away exemplary embodiment shown schematically in FIG. 5, the device according to the invention comprises a new solution for keeping the pouches in contact with eccentric track 4. This solution comprises of blowing the pouches in the direction of the eccentric track, i.e. downward, with air. For this purpose the device is in the shown exemplary embodiment provided with three fans 10-1 distributed over the length of this eccentric track comprising twelve eccentric shafts 8.

The invention of course has the provision that the rotation speed, and thereby the flow rate of the fans, can be adjusted, if desired also for each fan individually. Bringing about contact between the pouches and the eccentrics using air minimizes the chance of damage to the medication, while the pouches can still be tapped sufficiently by the eccentrics to de-stack and spread out medication which may be stacked.

An effect which is similar to blowing pouches against the eccentric track with air is achieved by positioning one or more fans under the eccentric track with the air suction side directed upward. The reference to one or more fans situated above the eccentric track can therefore also refer to embodiments in which one or more fans are positioned under the eccentric track.

In the exemplary embodiment shown in FIG. 5 not all eccentric shafts comprise the same number of eccentrics, and on some of the visible shafts two or more eccentrics have been pushed together in at least substantially the same position of the cam. The number of possible variants is almost infinite, and the invention has the provision that a user can change the number and the position of the eccentrics him/herself. The number of three fans, shown in FIG. 5, serves only by way of example, and the invention has the provision that the device can comprise more or fewer than three fans above the eccentric track.

Figure 6:
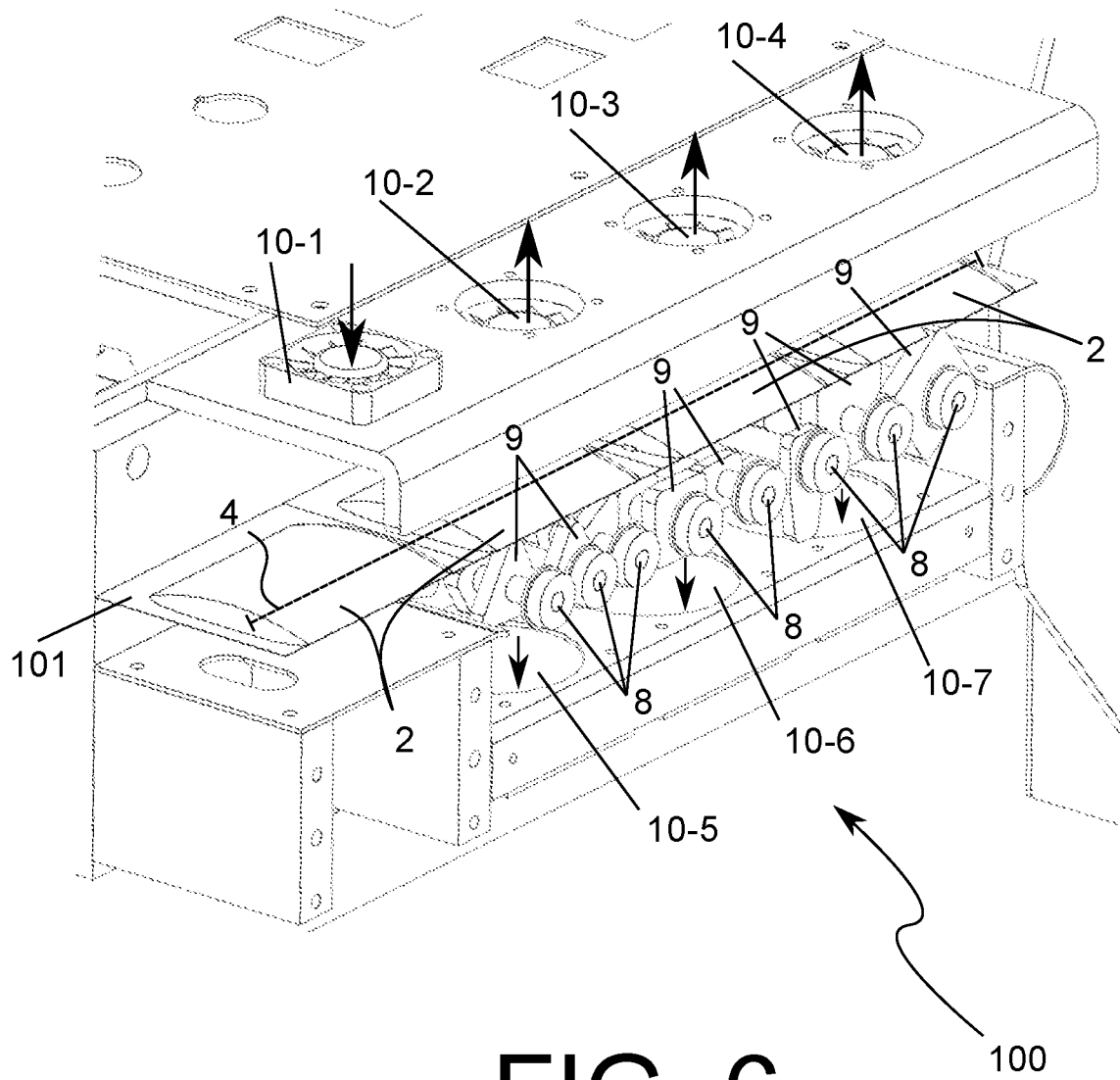
FIG. 6 is a cut-away schematic view of the eccentric track with pouches lying thereon and fans positioned above and below the eccentric track.

The embodiment of the device (100) according to the invention shown in FIG. 6 comprises three fans (10-2, 10-3, 10-4) above the eccentric track (4) and three fans (10-5, 10-6, 10-7) below the eccentric track (4). The suction side of the fans (10-2, 10-3, 10-4) is directed toward the eccentric track (4). In FIG. 6 the blowing direction of these fans (10-2, 10-3, 10-4) is indicated with an upright arrow. The suction side of the fans (10-5, 10-6, 10-7) is also directed toward the eccentric track (4). In FIG. 6 the blowing direction of these fans (10-5, 10-6, 10-7) is designated with a downward arrow. In contrast to the eccentrics 9 of the previous shown FIGS. 1-5, eccentrics 9 are non-round. The eccentrics 9 in this FIG. 6 have different peripheral shapes, including triangular, square, rectangular. The non-round eccentrics 9 can be arranged concentrically or eccentrically on an eccentric shaft 8. The condition here applies that eccentrics 9 make contact with a pouch with medications with a determined frequency during rotation about eccentric shaft 8

The term "and/or" relates mainly to one or more of the items stated before and after "and/or". A sentence "item 1 and/or item 2" (and similar sentences) for instance can relate to item 1 and item 2 or to item 1 or item 2. The term "comprise" (or derivatives thereof) also relates to embodiments in which the term "comprise" means "consist of". The term "comprise" can therefore mean "consist of" in some cases, but in other cases can mean "comprising at least the defined type and optionally one or more other types". In a claim the use of the word comprise or a derivative thereof does not preclude the presence of elements or steps outside of the elements or steps claimed in the claim.

Where use is made in the description of "substantially at a right angle", this may refer to forming an angle within the range of at least eighty-five and at most ninety-five degrees, and preferably within the range of at least eighty-eight and at most ninety-two degrees.

In the description and in the claims the terms spreading, dispersing and spreading out are synonyms, and all refer to an increase in the intermediate space between individual pills, tablets and/or capsules situated in a pouch placed substantially in horizontal position.

The exemplary embodiments of the device according to the invention discussed in this description and shown in the figures are only several of the many embodiments possible within the scope of the invention and must therefore be deemed non-limitative.

The invention claimed is:

1. A device for de-stacking and spreading out medication packaged in pouches, which pouches are arranged successively in a ribbon-like medication roll, comprising a transport track configured to transport the unrolled pouches of the medication roll, wherein the transport track comprises a section over which the pouches are displaceable and wherein the underside of at least one pouch lies against an upper side of the section during operation, and the section comprises means for de-stacking and spreading out the medication in a pouch lying on the section, wherein the device is configured to co-act with means for supplying or discharging the medication roll over the transport track, wherein the means for de-stacking and spreading out of the medication comprise an eccentric track, this eccentric track comprising a plurality of eccentric shafts placed adjacently of each other, which shafts are each arranged substantially at a right angle to the longitudinal direction of the transport track, and each eccentric shaft comprises one or more eccentrics.

2. The device as claimed in claim 1, wherein at least one eccentric is non-round.

3. The device as claimed in claim 1, wherein at least one eccentric is round and the eccentric is mounted eccentrically on an eccentric shaft.

4. The device as claimed in claim 1, wherein the device comprises at least one eccentric shaft with an eccentric mounted on the eccentric shaft at an angle.

5. The device as claimed in claim 1, wherein the drive motor drives one of the eccentric shafts, wherein the other shafts are also drivable by means of drive wheels which press against each other and which are for instance manufactured from rubber or another elastically deformable material.

6. The device as in claim 1, wherein the device comprises a sensor, wherein the device is configured such that during operation the supply means are switched off as soon as the sensor detects that a pouch is situated in the immediate vicinity of the sensor.

7. The device as claimed in claim 1, wherein the distance between successive eccentric shafts is chosen such that the peripheral edges of the eccentrics, as seen in transverse direction of the section, overlap each other and at least one eccentric shaft is drivable by means of a drive motor.

8. The device as in claim 1, wherein one or more eccentrics are slidable over the length of an eccentric shaft, rotatable about an eccentric shaft and fixable on an eccentric shaft.

9. The device as in claim 1, wherein the device comprises at least one fan situated above or below the eccentric track.

10. The device as claimed in claim 9, wherein the device comprises at least one fan situated above the eccentric track, wherein the suction sides of each of the fans situated above the eccentric track are directed toward the eccentric track.

11. The device as claimed in claim 9, wherein the device comprises at least one fan situated below the eccentric track, wherein the suction sides of each of the fans situated below the eccentric track are directed toward the eccentric track.

12. The device as claimed in claim 1, wherein one or more of the eccentric shafts comprises hexagonal rod material.

13. The device as claimed in claim 12, wherein at least one eccentric shaft comprises partially machined hexagonal rod material.

14. The device as claimed in claim 10, wherein the device comprises at least one fan situated below the eccentric track, wherein the suction sides of each of the fans situated below the eccentric track are directed toward the eccentric track.

* * * * *